United States Patent [19]
Ziegenbein

[11] Patent Number: 5,125,576
[45] Date of Patent: Jun. 30, 1992

[54] CONTAINER RINSE SYSTEM FOR AGRICULTURAL SPRAYER

[75] Inventor: Keith J. Ziegenbein, Ashland, Nebr.

[73] Assignee: AG-Chem Equipment Co., Inc., Minnetonka, Minn.

[21] Appl. No.: 701,854

[22] Filed: May 17, 1991

[51] Int. Cl.[5] .............................................. B05B 15/00
[52] U.S. Cl. .................................. 239/113; 239/124; 239/148; 239/172
[58] Field of Search ................ 239/112, 113, 124, 148, 239/172

[56] References Cited

U.S. PATENT DOCUMENTS 4,721,245 1/1988 Van Zweeden ..................... 239/113
4,817,870 4/1989 Dalton ................................. 239/172

Primary Examiner—Andres Kashnikow
Assistant Examiner—Lesley D. Morris
Attorney, Agent, or Firm—John A. Beehner

[57] ABSTRACT

A container rinse system for a portable sprayer includes a nozzle adapted to be mounted adjacent the fluid inlet opening of the main fluid tank of the sprayer at a position for insertion into the open mouth of a container situated to pour chemicals into the fluid inlet opening. The nozzle is connected to the main fluid pump for discharging fluid from the main tank through the nozzle for unlimited initial rinsing without dilution of the fluid in the main tank. The nozzle may alternately be connected to a clean water reservoir by a valve for a brief final rinsing requiring minimum fresh water supply on the sprayer. The valving preferably includes a safety valve actuated by a fail-safe switch to prevent fluid delivery to the nozzle, except when a container is properly situated over the nozzle for rinsing.

16 Claims, 2 Drawing Sheets

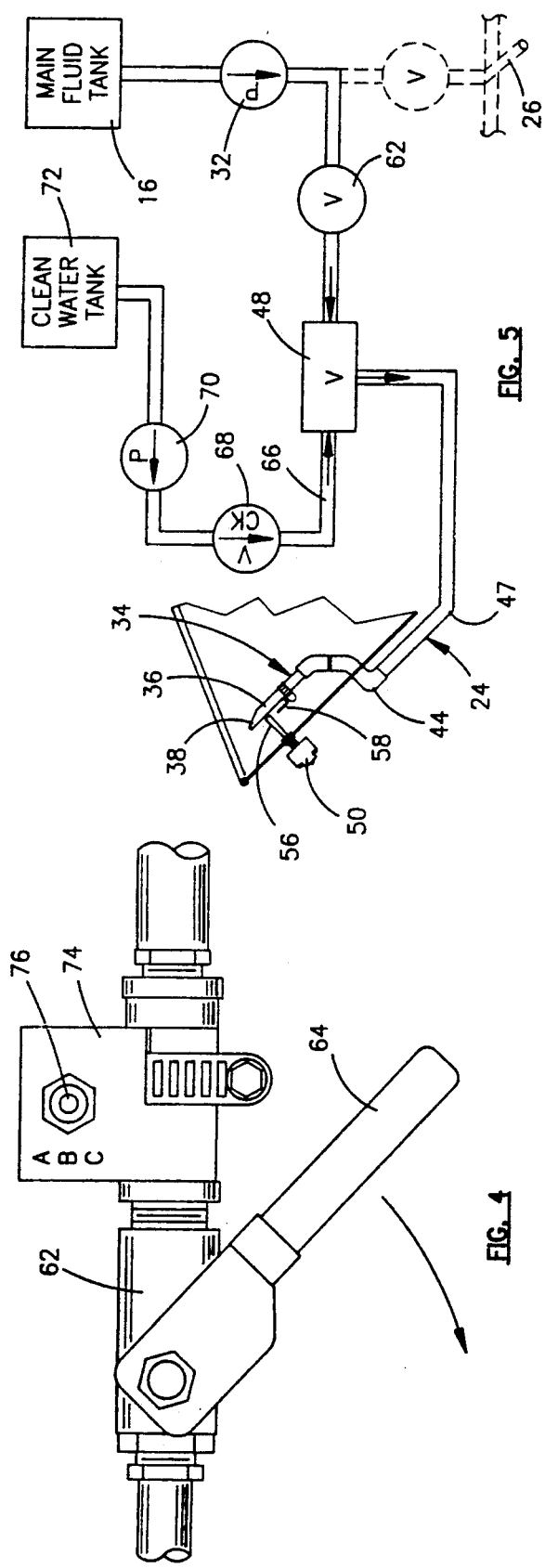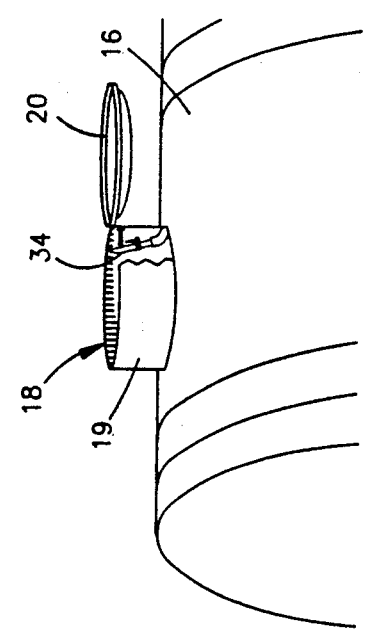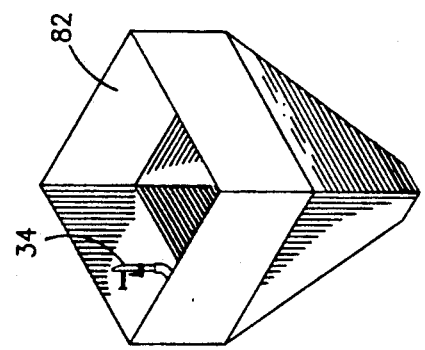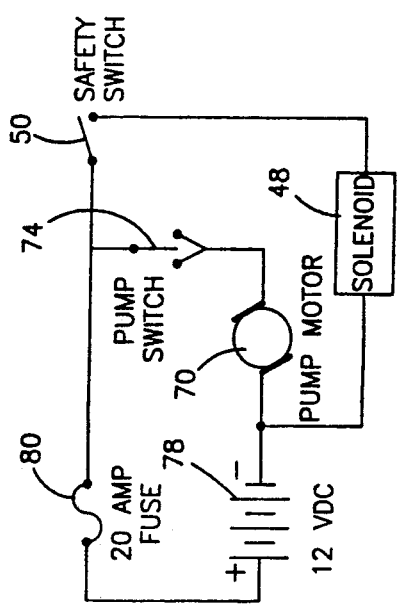

CONTAINER RINSE SYSTEM FOR AGRICULTURAL SPRAYER

BACKGROUND OF THE INVENTION

The present invention is directed generally to a container rinse system for agricultural sprayers and more particularly to a system wherein, upon inverting a container of chemicals for adding its contents to the main sprayer tank, fluid from the main sprayer tank is directed into the container under pressure for initial rinsing whereupon only a small amount of clean water is directed into the container required for final rinsing.

Large agricultural sprayers are typically self-propelled vehicles which include a large main fluid tank for storing chemical solutions to be sprayed onto an agricultural field. The chemicals may be fertilizers, pesticides, herbicides, or others. Generally, the farmer purchases the chemical in concentrated form in plastic containers and empties the chemicals into a solvent within the main fluid tank either through a top filler opening or through an inductor funnel conveniently positioned below the main fluid tank, but connected thereto by appropriate conduit and pump means for conveying fluid into the tank.

Since there may be a chemical residue of between perhaps a half inch and two inches at the bottom of the container, not all of the chemical is poured into the tank. Those chemicals are often harmful to the environment so disposal of the containers would be a problem. Generally, the Environmental Protection Agency has required that the containers be rinsed by a triple rinse system. This means that the container is refilled with solvents, such as water in an amount equal to ten (10%) percent of the volume of the container, with that mixture being poured into the inductor funnel for induction into the main fluid tank. This process is done three times to satisfy the federal requirement, after which the containers may be disposed of.

The problem is that triple rinsing may be ineffective for removing crusted residue from the bottom of the containers. This not only creates an environmental concern, but also deprives the farmer of the full use of all of the chemicals he paid for.

Triple rinsing of multiple containers with clean water results in a significant quantity of clean water being introduced into the main fluid tank, thereby diluting that fluid and decreasing its effectiveness at the recommended spray rates.

The government recommended triple rinsing has practical drawbacks which further limit its effectiveness. First, gravity flow of clean water from a rinse tank on top of the floater is ineffective for dislodging caked chemicals. The operator needs to shake the container and typically does not do a good job since the fluid is directed haphazardly within the container during shaking. The container would have to be shook for approximately ten (10) minutes for effective cleaning. Most operators won't spend that much time, particularly contract sprayers for whom time is of the essence.

Others avoid rinsing problems in the field by simply collecting the containers and taking them back to a plant or other central facility where the containers are rinsed using a high pressure hose. Often the containers are ineffectively rinsed and then burned. Continuous rinsing at a single site results in a build-up of pollution at that site which must necessarily be spaced at a distance from a well to avoid point source pollution.

A primary object of the invention, therefore, is to provide an improved apparatus and method for rinsing containers of chemicals upon emptying those containers into the main fluid tank of an agricultural sprayer.

Another object is to provide such an apparatus and method which accomplish thorough effective rinsing of chemical containers.

Another object is to provide such an apparatus and method which accomplishes effective rinsing of a container in a minimum amount of time;

Another object is to provide such an apparatus and method which significantly reduces the requirement for clean water storage and usage on an agricultural sprayer.

Another object is to provide such an apparatus and method which enables emptying and rinsing of a container in one step so that a container being emptied is not removed until it is rinsed.

Another object of the invention is to provide such an apparatus and method which enables substantially complete emptying of chemicals from containers.

Another object is to provide such an apparatus in kit form for installation on existing agricultural sprayers.

Another object is to provide such an apparatus and method which includes safeguards to protect the operator from accidental spray of chemicals and to prevent accidental loss of chemicals.

Another object is to provide such an apparatus and method which are effective whether the chemicals are added to the main fluid tank through a top filler opening, or through a conveniently situated inductor funnel.

Finally, another object is to provide such an apparatus which is simple and rugged in construction, economical to manufacture and efficient in operation.

SUMMARY OF THE INVENTION

The container rinse system of the present invention is designed for use with an agricultural sprayer equipped with a main fluid tank having a fluid inlet opening, at least one sprayer outlet and a main fluid pump operative to pump fluid from the main tank to the outlet. The rinse system of the invention adds a nozzle which is mounted adjacent the fluid inlet opening at a position for insertion into the open mouth of a container situated to pour chemicals into the fluid inlet opening. A main fluid conduit operatively connects the nozzle to the main fluid pump for discharging fluid from the main fluid tank through the nozzle at times. A clean water reservoir is mounted on the sprayer and is connected by a secondary fluid conduit to the nozzle for discharging clean water from the reservoir through the nozzle for final rinsing. Appropriate valving is interposed between the main fluid pump and nozzle and between the clean water reservoir and nozzle for alternately connecting the nozzle to the pump for high pressure pre-rinsing of a container and to the clean water reservoir for final rinsing.

If the agricultural sprayer is equipped with an inductor funnel for convenient emptying of chemical containers by an operator standing on the ground, the nozzle is preferably mounted on a sidewall of the inductor funnel with its open end facing the open top of the funnel.

The conduit which directs fluid to the nozzle incorporates a safety solenoid valve which is operated by a fail-safe switch mounted in close association to the nozzle, such that the mouth of a container placed over the nozzle trips the fail-safe switch to open the safety solenoid valve. The fail-safe switch is biased to a position for closing the solenoid valve so that when a container is withdrawn from the fluid inlet opening, the fail-safe switch automatically closes the safety solenoid valve thereby preventing discharge of fluid from the nozzle into the face of the operator or onto the ground. The fail-safe switch preferably includes a switch arm extended toward the nozzle at an angle generally perpendicular thereto. A toggle switch guide bumper may be secured to the nozzle at a position for limiting movement of the fail-safe switch trip arm to the "on" position thereof.

The valve means for the nozzle may further include a spring loaded valve interposed between the safety solenoid valve and main fluid pump. The spring loaded valve has a valve handle which is moveable between open and closed positions and which is spring loaded to the closed position for operation as a dead man's valve.

A rinse water pump is preferably interposed between the clean water reservoir and safety solenoid valve for pumping water from the reservoir through the safety solenoid valve to the nozzle for more effective rinsing than could be accomplished by gravity flow alone.

The container rinse system of the invention may be incorporated into new agricultural sprayers as original equipment or provided in kit form for installation in existing agricultural sprayers.

Finally, the invention furthermore, is directed to the method for rinsing containers of chemicals to be emptied into the main fluid tank of the above described agricultural sprayer. The method includes the steps of providing a nozzle mounted adjacent the fluid inlet opening as described above, inverting a chemical container to pour chemicals into the fluid inlet opening, lowering the inverted container over the nozzle so that the open end of the nozzle is received within the mouth of the container, activating the valve to connect the nozzle to the main fluid pump for directing fluid from the main fluid tank through the nozzle and into the container for heavy duty initial rinsing, returning the rinse fluid from the initial rinsing to the main fluid tank, actuating the appropriate valve to disconnect the nozzle from the main fluid tank after initial rinsing, and actuating the appropriate valve to connect the nozzle to the clean water reservoir for directing clean water through the nozzle into the container for final rinsing.

BRIEF DESCRIPTION OF THE DRAWINGS

FIG. 4 is a partial side elevational view of the spring loaded valve and rinse water pump switch;

FIG. 5 is a schematic fluid circuit diagram for the rinse system of the invention;

FIG. 6 is an electrical schematic diagram for the rinse system of the invention;

FIG. 7 is a partial perspective view of the rinse nozzle installed on an alternate inductor;

FIG. 8 is a partial perspective view, with portions broken away for clarity of the rinse nozzle mounted on the filler opening of the main tank of an agricultural sprayer.

DESCRIPTION OF THE PREFERRED EMBODIMENT

Figure 1:
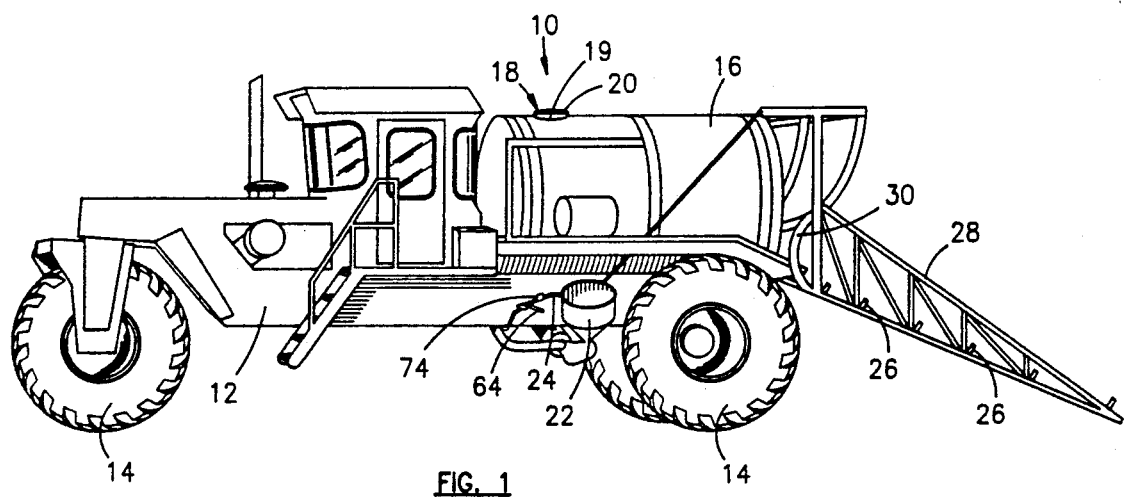
FIG. 1 is a perspective view of an agricultural sprayer equipped with an inductor for filling the tank with chemicals and with a clean water rinse tank mounted on the fender thereof.

The container rinse system of the present invention is illustrated in the drawings in connection with an agricultural sprayer 10 which is a self propelled vehicle having a chassis 12 supported on large floater ground wheels 14. Sprayer 10 carries a main fluid tank 16 for containing the fluid to be sprayed. Chemicals may be added to the main fluid tank either through the top filler opening 18 having a sidewall portion 19 and hinged cover 20, or through an inductor funnel 22. Funnel 22 is connected by appropriate valving and conduit 24 for conveying chemicals into the main fluid tank 16. A plurality of sprayer outlets 26 are carried on retractable boom 28 and connected by appropriate conduit 30 to a conventional main fluid pump 32 (FIG. 5) which is operative to pump fluid from the main tank 16 to the outlets 26.

Figure 2:
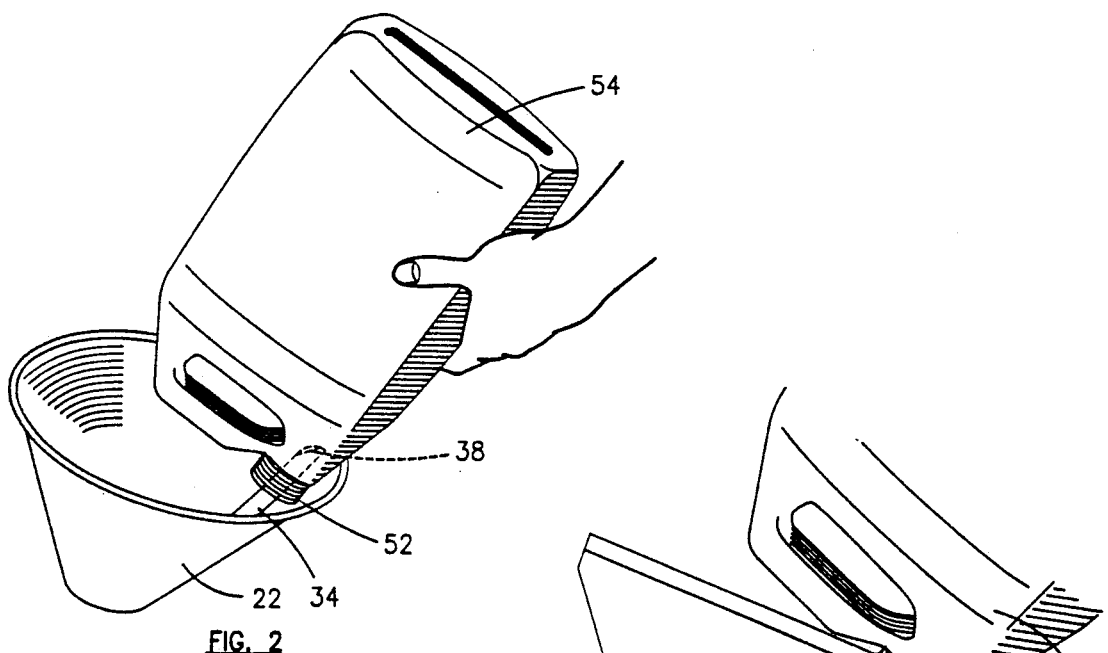
FIG. 2 is an enlarged perspective view showing a container being emptied into an inductor with the mouth of the container over the rinse nozzle.
Figure 3:
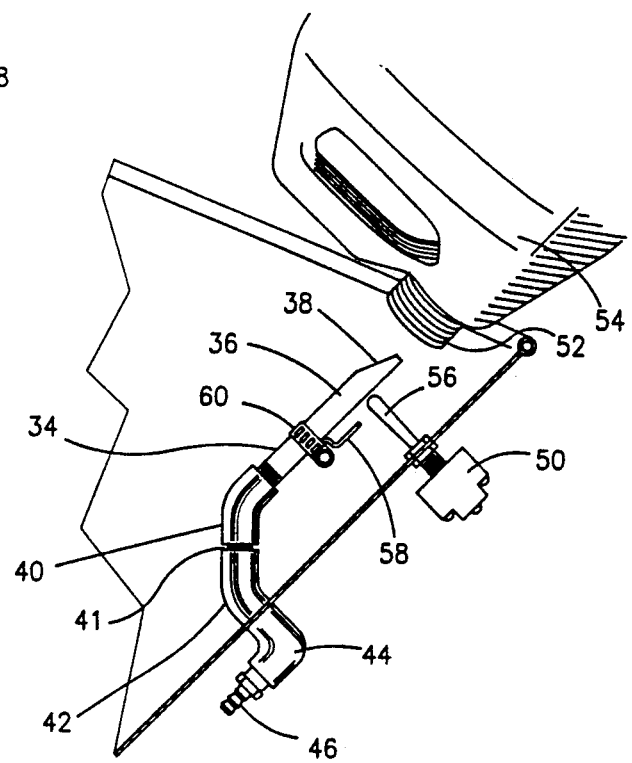
FIG. 3 is a partially sectional side view showing the rinse nozzle and fail-safe switch within the inductor.

Referring to FIGS. 2 and 3, the present invention adds the nozzle 34. In the preferred embodiment, nozzle 34 is a stainless steel tube 36 having a crimped slot 38 at its free-end, which slot is inclined at approximately a 45° angle to the axis of tube 36 for dispersing rinse fluid in a wider pattern than a straight stream. Tube 36 is connected by a stainless steel elbow 40, fitting 41, elbow 42 and a further fitting to an external galvanized elbow 44 equipped with a coupling 46 for connection by appropriate conduit 24 (FIG. 5) to a safety solenoid valve 48. Solenoid valve 48 is the final valve in the plumbing leading to nozzle 34 and is controlled by a fail-safe switch 50 which is mounted in close association to the nozzle 34, as shown in FIG. 3, such that the open mouth 52 of a container 54 trips fail-safe switch 50 as it is moved over the nozzle 34 to receive the nozzle therein. Fail-safe switch 50 is shown as a toggle switch including a switch arm 56 which is biased toward a valve closed position wherein it extends toward the nozzle at an angle generally perpendicular thereto. The clearance between switch arm 56 and nozzle 34 is preferably between approximately 1/16" and ⅛". This will keep the container threads from being caught between the switch arm and bottom of the nozzle. The switch arm 56 is preferably spaced about 1" from the end of the nozzle so that when the container mouth 52 pivots switch arm 56, nozzle 34 is inserted well within container 54. Pivotal movement of switch arm 56 is limited by contact with a guide bumper 58 so the switch arm 56 cannot be accidentally bent or overextended. Guide bumper 58 may be secured to nozzle 34 by any suitable means such as clamp 60. The fail-surface switch 50, which could also be controlled by a linkage extending outside of the inductor, will assure that the container is properly positioned and will thus eliminated the possibility of the operator spraying himself in the face instead of rising the container.

Upstream of safety solenoid valve 48 toward the main fluid tank 16 is a spring loaded valve 62 having a valve handle 64 pivotally moveable from the closed position illustrated in FIG. 4 clock-wise to an open or rinse position. The handle is spring biased to the closed position to function as a deadman valve. In a preferred embodiment, valve 62 is provided as a ½" spring loaded stainless steel stage I ball valve and is mounted adjacent inductor funnel 22 at a position that is easily reached by an operator pouring a container into the inductor funnel 22. The valve should be installed on the pressure side of the sprayer's main pump 32 before the agitator or sparger valve. This will give maximum pump pressure to the nozzle 34 even if the agitator valve is shut off. The nozzle pressure is, of course, dependent upon engine speed and product pump pressure.

Valve 62, when manually opened, charges the container rinse nozzle 34 with liquid directly from the mixture in the main fluid tank 16 via the main sprayer tank pump 32. This allows unlimited preliminary rinsing of the container because no additional rinse water is being added to the mixture to dilute it. This is a key feature because it is not uncommon to find a pesticide that has settled out and has much hard to remove sticky sediment left in the bottom of the container after the surface liquid has been poured off. By using the relatively large sprayer pump 32 to power the nozzle 34, the preliminary rinse behaves as if the nozzle 34 was turbo charged.

The safety solenoid valve 48 is also connected by a conduit 66 and check valve 68 to a rinse water pump 70 which is operatively interposed between the clean water reservoir 72 and safety solenoid valve 48 for pumping water from the reservoir 72 to the nozzle 34. Rinse water pump 70 is actuated by a pump switch 74 having a toggle 76 biased to the central off position designated by letter "B" in FIG. 4, but which may be pivoted in one direction to an on position designated by letter "A" or in the other direction to a "lock-on" position designated by the letter "C". The "lock-on" position can be used to accommodate an extra hose, for example, to use for in field window rinsing or other purposes. It is important not to leave the pump switch 74 in the "lock-on" position for normal container rinsing because the rinse water pump 70 will run when rinsing with fluid from the main fluid tank during pre-rinsing, which will needlessly exhaust the clean water supply sooner. Rinse water pump 70 will preferably force clean water into the container under pressure of approximately 60 psmax.

FIG. 6 illustrates a simple electrical schematic diagram for the container rinse system of the invention including the 12 volt battery 78 of the agricultural sprayer 10 and a 20 amp fuse so for circuit protection.

Whereas the inductor funnel 22 is illustrated in FIGS. 2 and 3 as having a somewhat frustoconical shape, other inductor shapes could likewise be used such as the downwardly converging square inductor 82 illustrated in FIG. 7. Nozzle 34 is situated on the sidewall thereof in the same relative position to the open top of the inductor as is illustrated in FIG. 3.

For sprayer units which are not equipped with an inductor for introducing chemicals into the main fluid tank 16, the nozzle 34 may be mounted within the filler opening 18 as illustrated in FIG. 8. In that instance, the nozzle 34 is positioned relative to the open top of the filler opening 18 in the same relative position as illustrated in FIG. 3 in connection with the open top of the funnel 22. Thus it will operate in the same manner when a chemical container is inverted and placed with its mouth over the free-end of the funnel for emptying its contents into the main fluid tank 16 and for being rinsed prior to withdrawal from the filler opening 18.

To accommodate the many sprayer vehicles and implements which are already in use, the container rinsing system of the invention may be provided in kit form for installation on such existing sprayer units for which it has been heretofore unavailable. The kit would include the nozzle 34, mounting hardware and connecting conduits, the safety solenoid valve 48 and fail-safe switch 50, the spring loaded deadman valve 62, the rinse water pump switch 74 and all necessary fittings required for installation, as well as possibly a clean water reservoir 72 if that is not already installed on the unit to be equipped with the invention. A rinse water pump may have to be included as well as various parts for completing the electrical and plumbing circuits for the container rinsing system of the invention.

The container rinsing system of the invention likewise presents a new method for rinsing a container of chemicals for a portable sprayer, including the steps of providing a nozzle mounted adjacent the fluid inlet opening of the main fluid tank at a position for insertion into the open mouth of a container situated to pour chemicals into the fluid inlet opening, inverting a container of chemicals to pour chemicals into the fluid inlet opening, lowering the inverted container over the nozzle so that the open end of the nozzle is received within the mouth of the container, actuating valve means to connect the nozzle to the main fluid pump for directing fluid from the main fluid tank through the nozzle into the container for heavy duty initial rinsing, returning the rinse fluid from the initial rinsing to the main fluid tank, actuating the appropriate valves to disconnect the nozzle from the main fluid tank and to connect the nozzle to the clean water reservoir for directing clean water through the nozzle and into the container for final rinsing. The system further contemplates returning the rinse fluid from the final rinsing to the main fluid tank, but the volume is expected to be so small, on the order of one quart, that its dilution effect in the main fluid tank will be inconsequential. The method may also include the step of automatically disabling the flow of fluid from the main fluid tank and clean water reservoir to the nozzle upon raising of the inverted container clear of the nozzle.

A significant advantage of the rinse system of the invention is that the container can be rotated and moved side to side during the rinse cycle. This allows a direct "blast" of rinse fluid onto substantially all of the inside surface of the container so one need not rely only on the splash effect to dislodge firmly caked pesticides and the like. For best results, it is recommended that the rinsing with the main fluid tank fluid be run at a minimum of 20 psi pump pressure. For a practiced operator, total rinse times of approximately 10 to 30 seconds will usually handle materials that are not settled out. Rinse time for settled out chemicals will vary greatly, but using the spring loaded valve 62 for pre-rinsing with solution from the main fluid tank to get most of the chemicals out will save dramatically on the clean water supply in reservoir 72. The time and trouble associated with rinsing chemical containers is also substantially reduced since, once the jug is positioned for emptying its contents into the inductor or main fluid tank, it is not removed until fully rinsed.

Whereas the invention has been shown and described in connection with the preferred embodiments thereof, it is apparent that many modifications, substitutions and additions may be made which are within the intended broad scope of the appended claims. For example, whereas the invention is disclosed in connection with a large self-propelled sprayer, it will likewise be applicable for any sprayer implement which is equipped with a fluid pump. Likewise, although agriculture is the expected environment wherein the container rinsing system will have the greatest application, other commercial and industrial sprayers may likewise be manufactured or modified to include the container rinsing system of the invention. The term "agricultural sprayer" is, therefore, intended to define the general type of sprayer without limitation to sprayers used only for agricultural purposes.

Thus there has been shown and described a container rinsing system for agricultural sprayers which accomplishes at least all of the stated objects.

I claim:

1. In combination,
   a portable sprayer equipped with a main fluid tank having a fluid inlet opening in operative communication with said main fluid tank for introducing chemicals into said main tank from a container, at least one sprayer outlet and a main fluid pump operative to pump fluid from said main tank to said outlet,
   a nozzle,
   means for mounting said nozzle adjacent said fluid inlet opening at a position for insertion into the open mouth of a container situated to pour chemicals into said fluid inlet opening,
   main fluid conduit means operatively connecting said nozzle to said main fluid pump for discharging fluid from said main fluid tank through said nozzle at times,
   a clean water reservoir,
   secondary fluid conduit means operatively connecting said nozzle to said clean water reservoir for discharging clean water from said reservoir through said nozzle for final rinsing of a container,
   valve means interposed between said main fluid pump and nozzle and between said clean water reservoir and nozzle for alternately connecting said nozzle to said pump for pre-rinsing of a container and to said clean water reservoir for final rinsing.

2. The combination of claim 1 wherein said portable sprayer is further equipped with an inductor funnel having an open top and means for conveying fluid from said inductor funnel to said main fluid tank, said fluid inlet opening comprising said open top of the inductor funnel.

3. The combination of claim 2 wherein said inductor funnel includes a generally conical sidewall, said nozzle being mounted on said sidewall and having an open end facing the open top of the inductor funnel.

4. The combination of claim 1 wherein said main fluid tank includes a filler opening through a top portion thereof said fluid inlet opening comprising said filler opening.

5. The combination of claim 1 wherein said valve means comprises a normally closed safety solenoid valve and a fail-safe switch electrically connected to said safety solenoid valve, said fail-safe switch being mounted in close association to said nozzle, such that the mouth of a container positioned to receive the nozzle therein trips said fail-safe switch to open said safety solenoid valve.

6. The combination of claim 5 wherein withdrawal of a container from said nozzle is operative to cause said fail-safe switch to automatically close said safety solenoid valve.

7. The combination of claim 6 wherein said fail-safe switch includes a switch arm extended toward said nozzle at an angle generally perpendicular thereto.

8. The combination of claim 7 further comprising a toggle switch guide bumper secured to said nozzle at a position for limiting movement of said fail-safe switch trip arm to the open position thereof.

9. The combination of claim 5 wherein said valve means further comprises a spring loaded valve interposed between said safety solenoid valve and main fluid pump, said spring loaded valve including a valve handle moveable between open and closed positions and spring loaded to the closed position thereof.

10. The combination of claim 9 further comprising a rinse water pump operatively interposed between said clean water reservoir and safety solenoid valve for pumping water from said reservoir through said safety solenoid valve to said nozzle.

11. The combination of claim 10 further comprising a rinse water pump switch mounted adjacent said spring loaded valve and including a switch arm moveable between on and off positions and biased to the off position thereof.

12. The combination of claim 11 wherein said rinse water pump switch further comprises a lock-on position for said trip arm wherein said rinse water pump remains on upon manual release of said trip arm in the lock-on position thereof.

13. A kit for modifying a portable sprayer to include a two stage rinsing capability for chemical containers, said sprayer being equipped with a main fluid tank having a fluid inlet opening in operative communication with said main fluid tank for introducing chemical additives into said main tank from a container, at least one sprayer outlet, a clean water reservoir and a main fluid pump operative to pump fluid from said main tank to said outlet, said kit comprising,
   a nozzle,
   means for mounting said nozzle adjacent said fluid inlet opening at a position for insertion into the open mouth of a container situated to pour additives into said fluid inlet opening,
   main fluid conduit means operatively connecting said nozzle to said main fluid pump for discharging fluid from said main fluid tank through said nozzle at times,
   secondary fluid conduit means operatively connecting said nozzle to said clean water reservoir for discharging clean water from said reservoir through said nozzle for final rinsing of a container, and
   valve means adapted to be interposed between said main fluid pump and nozzle and between said clean water reservoir and nozzle for alternately connecting said nozzle to said main fluid pump for pre-rinsing of a container and to said clean water reservoir for final rinsing.

14. A method for rinsing a container of chemicals for a portable sprayer equipped with a main fluid tank having a fluid inlet opening in operative communication with said main fluid tank for introducing chemicals into said main tank from a container, at least one sprayer outlet and a main fluid pump operative to pump fluid from said main tank to said outlet, said method comprising,
   providing a nozzle mounted adjacent said fluid inlet opening at a position for insertion into the open mouth of a container situated to pour chemicals into said fluid inlet opening, said nozzle being connected to said main fluid tank and clean water reservoir by conduit and valve means, inverting a chemical additive container to pour chemical additives into said fluid inlet opening, lowering said inverted container over said nozzle whereby the open end of said nozzle is received within the mouth of said container, upon initial emptying of the fluid contents of the container, actuating said valve means to connect said nozzle to said main fluid pump for directing fluid from said main fluid tank through said nozzle and into said container for heavy duty initial rinsing of the container, returning the rinse fluid from said initial rinsing to said main fluid tank, actuating said valve means to disconnect said nozzle from said main fluid tank after initial rinsing of the container, actuating said valve means to connect said nozzle to said clean water reservoir for directing clean water through said nozzle and into said container for final rinsing of said container.

15. The method of claim 14 further comprising returning said rinse fluid from said final rinsing to the main fluid tank.

16. The method of claim 14 further comprising automatically disabling the flow of fluid from said main fluid tank and clean water reservoir to said nozzle upon raising of the inverted container clear of the nozzle.

* * * * *